Oct. 23, 1951 J. A. TATEM 2,572,536
ELECTRODE TYPE WATER BOILER
Filed Nov. 18, 1949
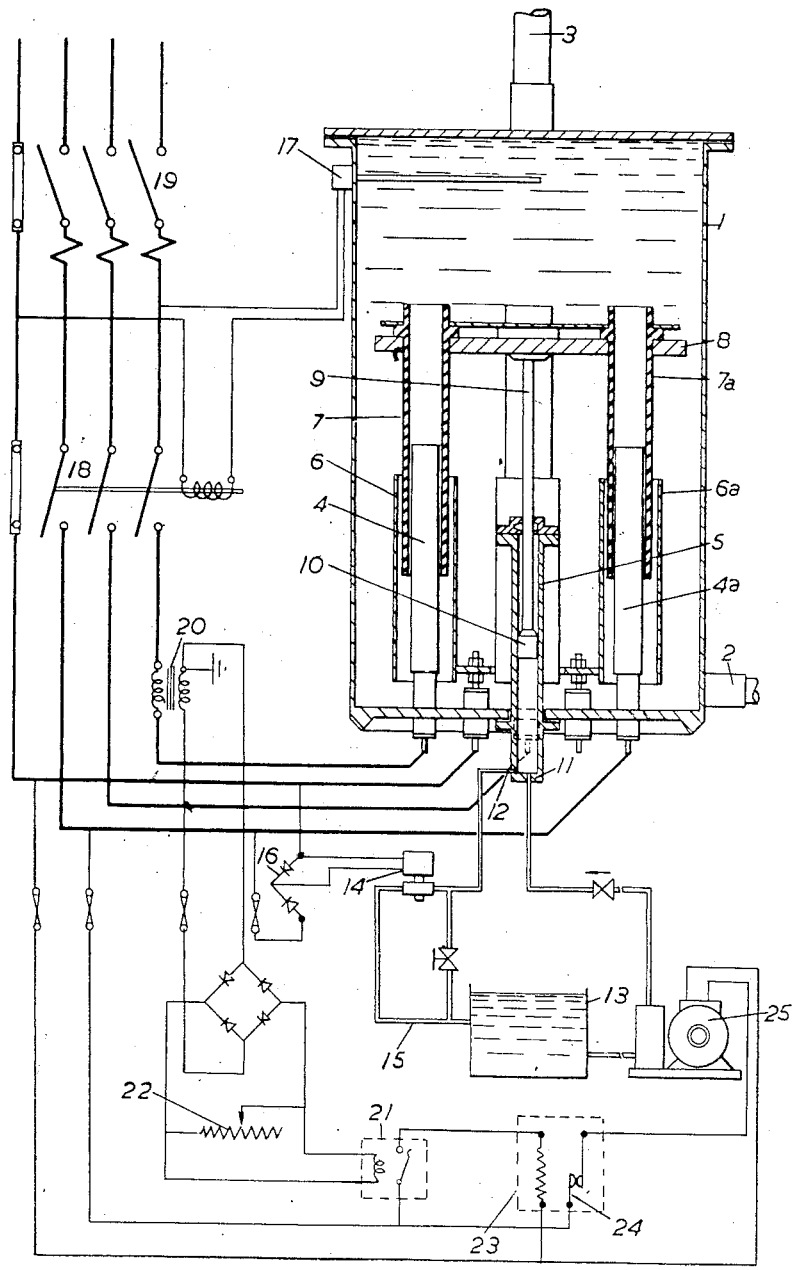
Inventor
John A. Tatem
By
Attorney

UNITED STATES PATENT OFFICE 2,572,536

ELECTRODE TYPE WATER BOILER

John Arthur Tatem, Dudley, England, assignor to G. W. B. Electric Furnaces Limited, Dudley, England Application November 18, 1949, Serial No. 128,121
In Great Britain November 22, 1948

6 Claims. (Cl. 219—40)

This invention relates to electrode type water boilers and is directed to improving their control and regulation.

According to the invention water boilers having electrodes and neutrals permanently secured to the bottom are fitted with insulating shields which screen the electrodes from the neutrals when the power is off but which are moved by an hydraulic motor to a position corresponding to a pre-set load when the power is switched on and which return to the screening position when the power is again switched off.

The piston of the hydraulic motor is preferably biased towards the position screening the electrodes from which it is moved by pressure derived from an electrically driven pump and to which it returns on the opening of a pressure release valve when the power is cut off.

The switching of the power supply may be automatically controlled by a thermostat in conventional manner and may include a manually operated master switch.

The above and other parts of the invention are embodied in one constructional form of boiler which will now be described in some detail by way of example with reference to the accompanying drawing which illustrates diagrammatically and in partial section a boiler and its control mechanism.

The boiler shell has a cold water inlet 2 near the bottom of the side wall and a hot water outlet 3 in the top.

There are one or more electrodes 4, 4a arranged around a central upstanding hydraulic cylinder 5.

Neutrals in the form of cylindrical shrouds 6, 6a surround each of the electrodes while leaving sufficient annular space for the free ingress of water and for the interposition of tubular insulating shields 7, 7a.

The insulating shields are attached by their upper ends to a heavy plate 8 which is carried by the extended rod 9 of a piston 10 which works in the hydraulic cylinder 5.

The arrangement is such that pressure applied to the lower end of the cylinder raises the plate and shields to expose lengths of the electrodes to the neutrals, while the weight of the plate will force the piston down the cylinder when the pressure is relieved.

Two ports 11, 12 are provided in the lower end of the hydraulic cylinder 5, one of these 11 is connected to a small electrically driven pump which takes its suction from a liquid reservoir 13 and the other 12 is connected to a magnetically operated valve 14 which controls a drain return 15 to the reservoir 13. The electric supply to the magnetic valve can be taken via a rectifier 16 from the electrode supply, or from other appropriate source.

A thermo sensitive switch 17 is exposed to the temperature of the water in the boiler and operates a contactor 18 whereby power to the electrodes is switched on and off to maintain a pre-set temperature range. A manually operated breaker 19 is also provided.

Inserted in the power supply to one electrode (after the switch) is the primary winding of a transformer 20. The secondary winding, one end of which is earthed, is taken to the operating coil of a relay 21. The current, proportional to the current and the load in the electrode supply sufficient to operate the relay, is selected by a variable rheostat 22 across the transformer secondary.

This relay 21 when energised operates a second relay 23 which opens a switch 24 in the supply to the pump 25.

The operation of the apparatus is as follows. Assume that the boiler is being switched on from cold, then when the manually operated breaker 19 is operated the thermo sensitive switch 17 will operate the contactor 18 and switch on the supply to the electrodes 4, 4a and thus to the magnetic valve 14 and the pump 25.

When the power is applied to the magnetic valve 14 it causes it to close, so that liquid pumped from the reservoir 13 by the electric pump 25 will move up the piston 10 in the hydraulic cylinder 5. The movement of the piston is transmitted to the plate 8 and the insulating shields 7, 7a which rise together to expose lengths of the electrodes to the neutrals 6, 6a.

When the shields 7, 7a have risen to an extent to permit a load in the electrode circuit corresponding to that pre-set by the variable rheostat 22, the circuit to the pump is broken by the two relays 21 and 23 and the upward movement of the shields is stopped.

The boiler will continue to operate at this load until the water temperature is raised to that necessary to operate the thermo-sensitive switch 17. Operation of the switch causes the contactor 18 to open and shut off current from the electrodes 4, 4a and the magnetic valve 14. The magnetic valve opens and allows the plate 8 and insulating shields 7, 7a to descend under their own weight, the liquid in the cylinder 5 being returned to the reservoir 13.

When the temperature of the water has fallen to the chosen degree, the thermo-sensitive switch 17 again operates the contactor 18 and switches on the supply to the electrodes, magnetic valve and pump, thus initiating a repetition of the cycle above described.

It will be apparent that whenever power is switched on to the electrodes, whether automatically or by hand, the shields are always in the lowest position, that is to say in the zero or low load position so that a full load of the boiler can never be switched on to the mains. Furthermore the load of the boiler cannot exceed that selected by the rheostat.

I claim:

1. An electrode type water boiler having in combination a shell, at least one electrode and at least one neutral secured to the bottom of the shell, at least one movable insulating shield to screen the electrode from the neutral and biassed into screen position, a hydraulic motor having a piston operatively connected to said shield for receiving said shield, an electrically driven pump operative to supply pressure to said hydraulic motor, a control circuit for energizing said pump to operate said motor to shift said shield to a position corresponding to a pre-set load when power is switched on to the boiler, and a pressure release valve operative to release pressure from said hydraulic motor when power is switched off the boiler to permit said shield to return to screening position.

2. An electrode type boiler according to claim 1 in which the load of the boiler is pre-set by means of a rheostat across the secondary winding of a transformer, the primary winding of which is in series with the power supply to an electrode.

3. An electrode type water boiler according to claim 2 in which a relay operated by current proportional to the pre-set electrode load current is used to control the stopping and starting of the electrically driven pump which supplies operating pressure to the hydraulic motor.

4. An electrode type water boiler according to claim 3 in which a second relay energized through a switch operated by the first mentioned relay is used to operate the control switch of the pump.

5. An electrode type water boiler according to claim 1 having a manually operable switch for starting and shutting down the boiler and a thermostatically controlled contactor for maintaining pre-set temperature conditions in the boiler.

6. An electrode type water boiler according to claim 1 having an electrically driven pump for supplying hydraulic pressure to the said motor to move the insulating shield from the screening position when power is switched on and a pressure relief valve magnetically operated by current derived through a rectifier from an electrode supply to maintain the said pressure until power to the electrode supply is cut off.

JOHN ARTHUR TATEM.

REFERENCES CITED

The following references are of record in the file of this patent:

UNITED STATES PATENTS

| Number | Name | Date |
|---|---|---|
| 1,023,602 | Wallmann | Apr. 16, 1912 |
| 1,760,230 | Crawley | May 27, 1930 |
| 2,428,714 | Livingstone | Oct. 7, 1947 |

FOREIGN PATENTS

| Number | Country | Date |
|---|---|---|
| 395,223 | Great Britain | July 13, 1933 |
| 416,546 | Great Britain | Sept. 17, 1934 |
| 493,759 | Great Britain | Oct. 10, 1938 |